(12) United States Patent
Saito et al.

(10) Patent No.: US 6,572,808 B1
(45) Date of Patent: Jun. 3, 2003

(54) METHOD FOR PRODUCING A MOLDED LAMINATE

(75) Inventors: Yoshiaki Saito, Ichihara (JP); Terunobu Fukushima, Maebashi (JP)

(73) Assignees: Idemitsu Petrochemical Co., Ltd., Tokyo (JP); Sanwakako Co., Ltd., Maebashi (JP)

( * ) Notice: Subject to any disclaimer, the term of this patent is extended or adjusted under 35 U.S.C. 154(b) by 0 days.

(21) Appl. No.: 09/622,460

(22) PCT Filed: Dec. 16, 1999

(86) PCT No.: PCT/JP99/07065
§ 371 (c)(1),
(2), (4) Date: Oct. 30, 2000

(87) PCT Pub. No.: WO00/35651
PCT Pub. Date: Jun. 22, 2000

(30) Foreign Application Priority Data

Dec. 17, 1998 (JP) ............................................. 10-359183

(51) Int. Cl.[7] ................................................. B29C 45/14
(52) U.S. Cl. ..................... 264/261; 264/259; 156/245
(58) Field of Search ................................ 264/46.4, 259, 264/261; 156/245

(56) References Cited

U.S. PATENT DOCUMENTS

| | | | | |
|---|---|---|---|---|
| 4,218,505 A | * | 8/1980 | Shiga et al. | ................. 428/306 |
| 4,541,885 A | * | 9/1985 | Caudill et al. | ............... 264/321 |
| 4,844,955 A | * | 7/1989 | Graefe et al. | ................ 428/420 |
| 4,873,045 A | * | 10/1989 | Fujita et al. | ................. 264/259 |
| 5,281,376 A | * | 1/1994 | Hara et al. | ................... 264/46.4 |
| 5,300,360 A | * | 4/1994 | Kocsis et al. | ............. 428/304.4 |
| 5,641,439 A | * | 6/1997 | Rogerson | ................ 264/46.4 |

FOREIGN PATENT DOCUMENTS

| | | |
|---|---|---|
| JP | 61-62487 | 3/1986 |
| JP | 8-127042 | 5/1986 |
| JP | 2-25806 | 6/1990 |
| JP | 3-60297 | 9/1991 |
| JP | 10-15993 | 1/1998 |
| JP | 10-24445 | 1/1998 |

* cited by examiner

*Primary Examiner*—Allan R. Kuhns
(74) *Attorney, Agent, or Firm*—Flynn, Thiel, Boutell & Tanis, P.C.

(57) ABSTRACT

A laminated molding product having a surface member with superior property made of urethane foam and manufacturing process thereof are provided. The laminated molding product includes a thermoplastic resin base and an ether type urethane foam (131) mainly made of polyether polyol integrally attached by injection compression molding or injection molding under pressure of 50 kg/cm² according to average pressure relative to project area of a molding cavity. The urethane foam may alternatively be ester/ether type urethane foam mainly made of polyester polyol and polyether polyol.

10 Claims, 2 Drawing Sheets

METHOD FOR PRODUCING A MOLDED LAMINATE

TECHNICAL FIELD

The present invention relates to a laminated molding integrated with flexible surface member and a process for manufacturing the laminated molding.

BACKGROUND ART

Conventionally, a laminated molding integrated with flexible surface member is used as interior parts of an automobile such as a sun visor and headrest and as an airflow control valve of an automobile air conditioner.

Since a surface of such laminated molding is covered with the flexible surface member, good feel can be obtained in touching by hand.

Further, since a desired cushion property can be obtained by increasing thickness of the surface member, the laminated molding can be used to a component such as a lid of a console box, thus restraining shock sound in opening and shutting and vibration during drive.

Furthermore, since the surface member having cushioning property can seal a gap, good sound insulation and sealing can be given to an airflow control valve when it is applied to an airflow control valve of an automobile air conditioner.

As a process for manufacturing the laminated molding, following manufacturing processes have been conventionally used.

Method A

Manufacturing the laminated molding by attaching the surface member by an adhesive etc. onto a surface of a molding previously manufactured by an injection molding process.

According to the above process, since the surface member has to be attached onto each molding, productivity can be deteriorated on account of work for the attaching process and, furthermore, sufficient attachment strength cannot be obtained by the attaching process with the use of adhesive.

Method B

Filling molten resin between two surface members attached with anti-penetration sheet disposed in a die and press-molding thereof (Japanese Patent Publication No. Hei 2-25806).

According to the above-method, since a nozzle of an extruder has to be advanced and retracted relative to the die for every time filling the molten resin, cycle time for molding one molding product can be lengthened. Further, since the anti-penetration sheet has to be attached to the surface member, manufacturing process can be troublesome.

Method C

After closing a die disposed with two surface members thereinside, injecting and filling molten resin into the die while retaining low pressure and cooling the molten resin to solidify while keeping low dwell pressure (Japanese Patent Publication No. Hei 3-60297).

According to the above method, since the injection pressure is kept relatively low, it requires considerable time to fill the molten resin, thus increasing cycle time, and furthermore, sufficient cushion property cannot be obtained according to material of the surface member.

For solving the problems associated with the respective methods, another method has been proposed (Japanese Patent Application Laid-Open Publication No. 8-127042), where, after a surface member is attached to a molding surface of a compression core on a movable die side, the compression core is advanced to compress the filled molten resin, thus manufacturing a laminated molding integrated with the surface member.

As a material of the surface member, especially for airflow control valve of an air conditioner of an automobile, polyurethane foam is proposed as well as polyethylene foam and polypropylene foam.

According to the manufacturing method of the above invention, cycle time can be reduced without impairing quality of the surface member.

However, though no special problem occurs when the material of the surface member is a foam of polyethylene and polypropylene etc., on account of properties of polyurethane foam different from the other foams, polyurethane foam can be damaged or wrinkled under the same molding condition as the polyethylene etc., a laminated molding having good properties cannot always be obtained.

DISCLOSURE OF THE INVENTION

An object of the present invention is to provide a laminated molding having a surface member made of urethane foam with good properties and a process for manufacturing the same.

A laminated molding according to first aspect of the present invention has a thermoplastic resin base and an ether type urethane foam provided at least one side of the base, the ether type urethane foam mainly made of polyether polyol, which is characterized in that the thermoplastic resin base and the urethane foam are integrally attached by injection compression molding or injection molding under a pressure loading of average pressure relative to project area of a molding cavity of not more than 50 kg/cm$^2$.

The pressure loading refers to a pressure applied to the resin in the die. It refers not only the compression force in the injection compression molding but also includes injection pressure in the injection molding.

The project area of the molding cavity is, in other words, an area of the molding product in a direction orthogonal with open/shut direction of the die.

A laminated molding according to second aspect of the present invention has a thermoplastic resin base and an ester/ether type urethane foam provided at least one side of the base, the ester/ether type urethane foam mainly made of polyester polyol and polyether polyol, which is characterized in that the thermoplastic resin base and the urethane foam are integrally attached by injection compression molding or injection molding under a pressure loading of average pressure relative to project area of a molding cavity of not more than 50 kg/cm$^2$.

The ester/ether type urethane foam includes 10 to 60 wt % of polyester polyol.

The ether type urethane foam and the ester/ether type urethane foam constitute the surface member for the thermoplastic resin base.

The urethane foam can be classified mainly into three types, i.e. ester type urethane foam, ether type urethane foam and ester/ether type urethane foam.

Though the ester type urethane foam is superior in heat resistance, mechanical strength and non-air-permeability, it is hydrolytic and inferior in moist heat aging property. Further, it costs relatively expensive.

Though the ether type urethane foam is not hydrolytic and superior in moist heat aging property, it is inferior in heat resistance and mechanical strength. Further, it cost relatively inexpensive.

The ester/ether type urethane foam is similar to the ether type urethane foam in properties thereof and air permeability (air tightness) can be easily controlled.

Accordingly, since the ether type urethane foam or the ester/ether type urethane foam has characteristics different from the ester type urethane foam, manufacturing condition should be in accordance with the characteristics of the urethane foams.

Specifically, since the ether type urethane foam and the ester/ether type urethane foam are low in heat resistance and strength, when attaching to the base simultaneously with molding step under the same condition as the surface member made of polyester etc, the urethane foams may be broken or wrinkled on account of high temperature and high pressure. Further, the thickness of the urethane foam may be decreased under high temperature and high pressure to lower shock absorption or may be hardened to deteriorate touch thereof.

Accordingly, the present invention has been reached by discovering that, when the urethane foam is ether type or ester/ether type, the above problem of damage on the polyurethane foam can be restrained by integrally attaching the base with the urethane foam under a pressure loading of average pressure of not more than 50 kg/cm$^2$, preferably between 30 to 5 kg/cm$^2$ relative to project area of the molding cavity. The present invention is especially suitable for attaching the ether type urethane foam with the thermoplastic resin base, however, the present invention can also be suitably used for ester/ether type urethane foam.

As a foaming agent of the urethane foam, various foaming agent such as water, flon, methylene chloride etc. can be used.

Though expansion ratio is not restricted, a range of 25 to 100 is appropriate for a sealing member.

Air permeability is preferably not more than 50 cc/cm$^2$/second when it is used for air sealing member such as air-current control valve of an automobile air conditioner. Air sealing property deteriorates when exceeding 50 cc/cm$^2$/second.

Density is preferably 10 to 40 kg/m$^3$. Air permeability can be excessive when density is less than 10 kg/m$^3$ and shock absorption can be insufficient when density is over 40 kg/m$^3$.

Hardness is preferably 5 to 30 kg/200 mm$\phi$. When hardness is less than 5 kg/200 mm$\phi$, air permeability can be excessive and shock absorption can be insufficient when hardness exceeds 30 kg/200 mm$\phi$.

A laminated material integrated with resin film, woven fabric, non-woven fabric on at least one side may be used as the urethane foam.

Though the thermoplastic resin base is not restricted, polyethylene, polypropylene, polystyrene, ABS, polycarbonate, polyamide (nylon) etc. may be used. Various additives such as filler, e.g. talc, calcium carbonate, mica and glass fiber, stabilizer, and coloring agent may be added into the resin base.

Third aspect of the present invention is a method for producing a laminated molding according to first and second aspect of the present invention, which is characterized in that, when the urethane foam is set onto a die and a thermoplastic resin is supplied to the die to integrally attach the thermoplastic resin base with the urethane foam simultaneously with injection compression molding or injection molding, a pressure loading applied to the resin is retained not more than 50 kg/cm$^2$ of average pressure relative to a project area of a molding cavity.

The present aspect of the invention is a method for manufacturing the laminated molding according to first and second aspect of the present invention.

Specific reason etc. of molding condition is the same as described in the first and the second aspect of the present invention.

A method for manufacturing a laminated molding according to fourth aspect of the present invention is, in the third aspect of the invention, characterized in further comprising the steps of: attaching the urethane foam on at least one of molding surfaces of the mutually opposing dies; while keeping the above state, closing the die with a predetermined compression margin retained; filling molten resin onto a side of the urethane foam opposite to another side of the urethane foam in close contact with the molding surface; clamping the die and applying a compression force to the molten resin in the die to pack the molten resin to the entirety of the die; and after packing the molten resin, decreasing the compression force applied to the molten resin.

The present invention shows more specific molding process of the third aspect of the present invention.

The clamping step of the die can be conducted by completely clamping the dies previously incompletely closed, or alternatively, advancing the compression core previously retracted.

According to the present invention, during a step for filling the molten resin, a space larger than the molding product is formed within the die. Therefore, when the molten resin is filled in the die by increasing the injection pressure, since there is a space for the molten resin to be spread in the die, the molten resin filled in the die does not get too much pressure, so that the molten resin does not press the urethane foam with a strong force.

Since the urethane foam is sandwiched by the resin base and the die after completion of packing the resin in the die, the compression force for compressing the die is directly converted into a force for compressing the urethane foam. However, since the compression force by clamping the die is lowered, the urethane foam is not pressed with a great force.

Accordingly, the injection pressure can be increased to fill the molten resin at a high speed, thus reducing cycle time. Further, even when the injection pressure increases, the urethane foam does not break or get wrinkled by being strongly pressed.

A method for producing a laminated molding according to fifth aspect of the present invention is, in the third aspect of the present invention, characterized in having the steps of: attaching the urethane foam on both molding surfaces of the mutually opposing dies; making the dies attached with the urethane foam closer so that the urethane foams touch with each other; while keeping the above state, filling the molten resin between the urethane foams; after the molten resin is filled around a gate for introducing the molten resin into the die, while continuing to fill the molten resin, opening the die to secure a predetermined compression margin; and immediately before or after completion of filling the molten resin, clamping the die and applying a compression force to the molten resin in the die to pack the molten resin to the entirety of the die.

The present invention is a method for manufacturing a laminated molding provided with urethane foam on both sides of the resin base.

Incidentally, when the attached urethane foam blocks the gate for supplying the molten resin, a hole may be opened to the urethane foam on the stationary die side at a position corresponding to the gate, so that the molten resin can be supplied into the die through the hole on the urethane foam.

A method for producing a laminated molding according to sixth aspect of the present invention is, in the fourth and fifth aspect of the present invention, characterized in that the compression force decreased after packing the molten resin in the entirety of the die is re-raised before the molten resin solidifies.

After the surface of the molten resin is cooled to a degree, penetration of the molten resin into the urethane foam or melting of the urethane foam can be restrained, so that a disadvantage such as damage on the urethane foam is not caused even when the compression force of the die is re-raised. Therefore, by re-raising the compression force of the die before the entire molten resin completely solidifies, cooling time of the resin can be shortened without impairing quality of the urethane foam, thereby reducing cycle time.

A method for producing a laminated molding according to seventh aspect of the present invention is, in the third aspect of the present invention, characterized in that the urethane foam is attached onto only one of the molding surfaces of the mutually opposing dies, and that the resin is filled while keeping a cavity clearance between the mutually opposing dies not less than a thickness of the urethane foam under normal temperature and normal pressure and not more than a value adding 20 mm to the thickness.

When the cavity clearance exceeds "thickness of the urethane foam under normal temperature and normal pressure+20 mm", since the die moves excessively during compression step, droop of resin by gravity or insufficient filling and deterioration in appearance on account of increase of internal pressure in the die can be easily generated.

On the contrary, when the cavity clearance is less than "a thickness of the urethane foam under normal temperature and normal pressure", especially when the foam is thin, filling pressure can exceed 50 kg/cm$^2$, so that foam dragging by the resin can be unfavorably occurred.

A method for producing a laminated molding according to eighth aspect of the present invention is, in the third aspect of the present invention, characterized in that the urethane foam is attached onto both molding surfaces of the mutually opposing dies, and that the resin is filled while keeping a cavity clearance between the mutually opposing dies not less than a sum of a thickness of the respective urethane foams under normal temperature and normal pressure and not more than a value adding 20 mm to the sum of the thickness.

When the cavity clearance exceeds "a sum of thickness of the urethane foams under normal temperature and normal pressure+20 mm", since the die moves excessively during compression step, droop of resin by gravity or insufficient filling and deterioration in appearance on account of increase of internal pressure in the die can be easily generated.

On the contrary, when the cavity clearance is less than "a sum of thickness of the urethane foam under normal temperature and normal pressure", especially when the foam is thin, filling pressure can exceed 50 kg/cm$^2$, so that foam dragging by the resin can unfavorably be occurred.

A method for producing a laminated molding according ninth aspect of the present invention is, in the fifth aspect of the present invention, characterized in: that a sum of thickness of the respective urethane foams brought into contact with each other when the mutually opposing dies approaches is set not more than a sum of thickness of the respective urethane foams under normal temperature and normal pressure, and, thereafter, the molten resin is filled between the urethane foams; that, after the molten resin is filled at least around a gate for introducing the molten resin to the die, while continuing to fill the molten resin, the die is opened so that the predetermined compression margin is not less than the sum of thickness of the urethane foam under normal temperature and normal pressure and not more than a value adding 20 mm to the sum; and that the compression force is applied to the molten resin inside the die by clamping the die immediately before or after completion of filling the molten resin to pack the molten resin to the entirety of the dies.

According to the present invention, the two urethane foams are sandwiched between the dies while being compressed before filling and until the molten resin is filled around the gate, so that the position shift of the foam immediately after initiation of filling the resin and underrun of the resin toward backside of the foam (external side of a product) can be securely prevented. When the molten resin is filled around the gate, the die is opened to a predetermined compression margin while continuing to fill the molten resin, so that applied pressure to the urethane foam by the filling pressure of the resin can be reduced, thus easily reducing foam collapsing. Incidentally, limitation of the predetermined compression margin and the effects accompanying thereto is the same as the description of the cavity clearance described in the eighth aspect of the present invention.

BEST MODE FOR CARRYING OUT THE INVENTION

A laminated molding according to an embodiment of the present invention as well as a process for manufacturing the same will be described below with reference to drawings.

Figure 1:
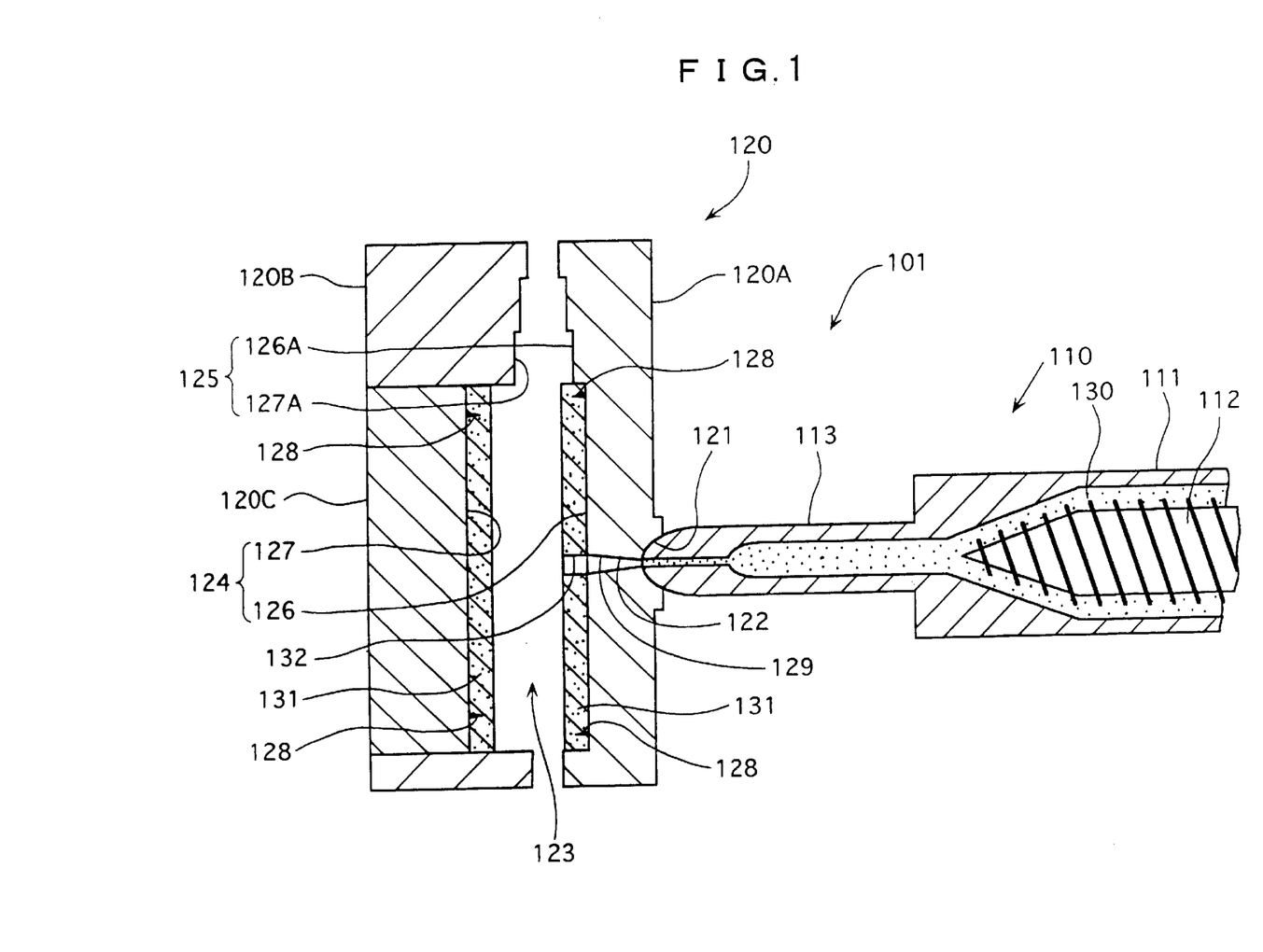
FIG. 1 is a cross section showing a process for manufacturing a laminated molding according to first embodiment of the present invention.

As shown in FIG. 1, an injection compression molding machine 101 according to the present embodiment has an injection device 110 for injecting a molten resin 130 and a molding die 120.

The injection device 110 has a screw 112 for kneading the molten synthetic resin 130 inside a cylindrical barrel 111. A nozzle 113 is provided at a tip end of the barrel 111.

The die 120 has a stationary die 120A, a movable die 120B, and a compression core 120C advanceable and retractable relative to the movable die 120B.

The stationary die 120A is fixed to the injection compression molding machine 101 in a non-movable manner. A bush 121 is provided to the stationary die 120A. Additionally, a sprue 122 for introducing the resin 130 into the die 120 penetrates approximately central portion of the stationary die 120A.

The, movable die 120B is movably provided to the injection compression molding machine 101.

A clamping device (not shown) is disposed to the movable die 120B. The die 120 is closed by pressing the movable die 120B toward the stationary die 120A by the clamping device.

The compression core 120C compresses the molten resin 130 filled in the die 120. A compression device (not shown) is disposed to the compression core 120C.

A cavity formed by the stationary die 120A, the movable die 120B and the compression core 120C has an attachment portion 124 for attaching the urethane foam 131 and a non-attachment portion 125 without attaching the urethane foam 131.

The attachment portion 124 is arranged on mutually opposing molding surfaces 126 and 127 on the stationary die 120A and the compression core 120C. A plurality of pin 128 as a fixing means for fixing the urethane foam 131 is provided on the attachment portion 124. The pins 128 protrude from the molding surfaces 126 and 127 to fix the urethane foam 131 onto the stationary die 120A and the compression core 120C.

The non-attachment portion 125 is arranged on mutually opposing molding surfaces 126A and 127A on the stationary die 120A and the movable die 120B. The non-attachment portion 125 forms a part of the molding product without the urethane foam 131, e.g. other parts having no urethane foam 131 for a convenience in combining with the other molding product.

When the urethane foam 131 is attached on both molding surfaces 126 and 127 respectively, the urethane foam 131 secured to the molding surface 126 on the stationary die 120A side has a through hole 132 as a passage of the molten resin 130 at a position corresponding to a direct gate 129 as an exit of the sprue 122.

The injection compression molding machine 101 is used to manufacture the laminated molding of the present embodiment according to following steps.

First, the die 120 is opened and, after the urethane foam 131 is attached on either one or both of the molding surfaces 126 and 127 of the stationary die 120A and the compression core 120C, the die 120 is closed.

Figure 2:
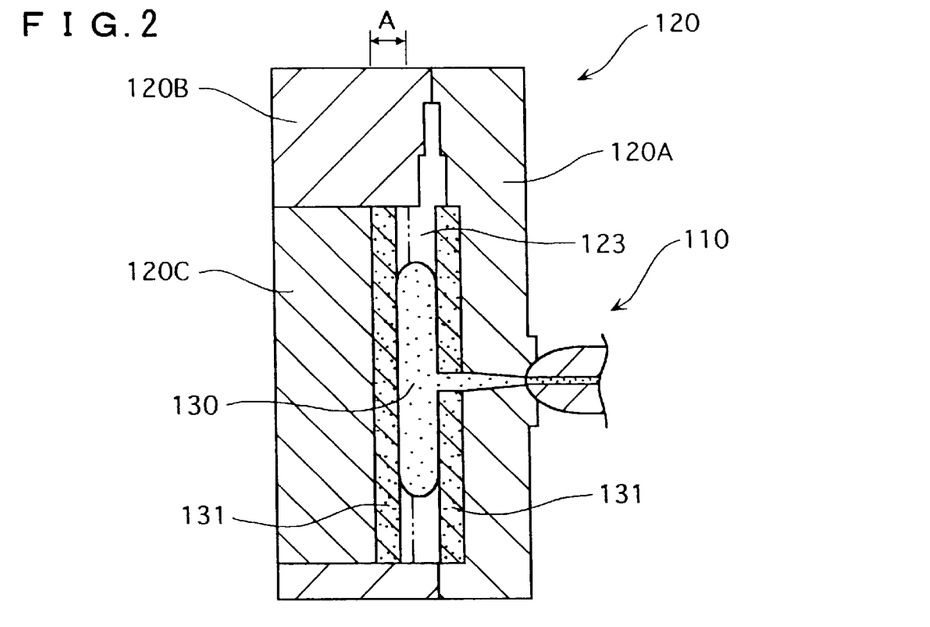
FIG. 2 is a cross section showing the process for manufacturing the laminated molding according to the above embodiment.

At this time, the compression core 120C stays retracted to secure a compression margin A as a distance for the compression core 120C to be moved during the compression step as shown in FIG. 2, and thereafter, the injection device 110 is driven to initiate filling step to fill the molten resin 130 into the inside of the cavity 123 of the die 120.

Figure 3:
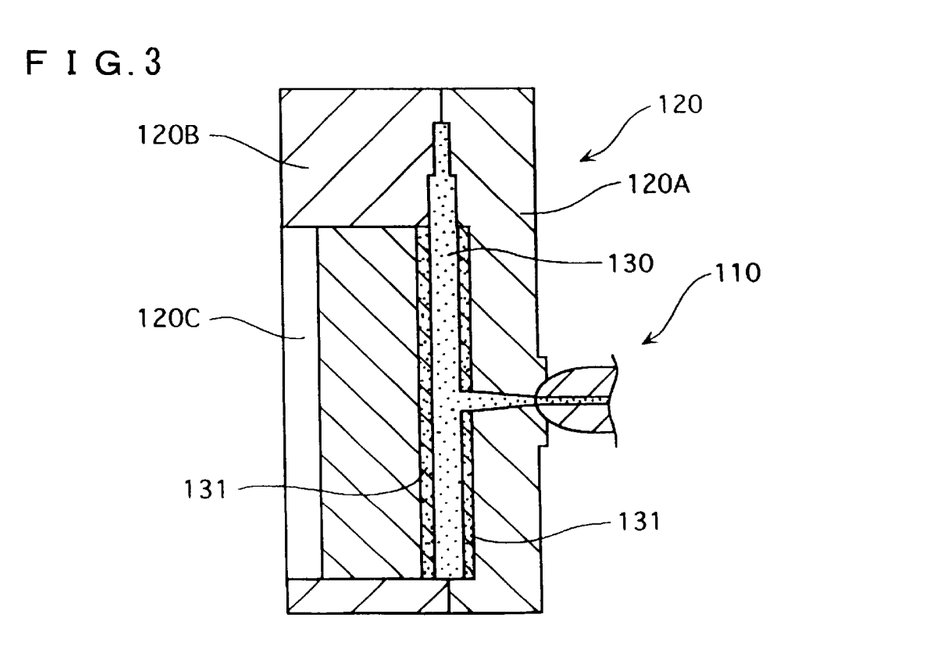
FIG. 3 is a cross section showing the process for manufacturing the laminated molding according to the above embodiment.

Subsequently, immediately before or immediately after completion of the filling step, the compression device is driven to initiate compression step where, as shown in FIG. 3, the compression core 120C advances to apply compression force to the molten resin 130 inside the cavity 123.

During the compression step, a packing step for spreading the molten resin 130 over an entirety of the cavity 123, a protecting step for reducing the compression force applied to the molten resin 130 and a dwelling step for re-raising the compression force applied to the molten resin 130 are sequentially conducted.

Specifically, during the packing step, the compression core 120C is advanced to pack the molten resin 130 all over the inside of the cavity 123. When the molten resin 130 is distributed to the entirety of the inside of the cavity 123, the packing step is terminated.

Subsequently, in order to avoid the urethane foam 131 from being smashed or damaged, the compression force applied to the molten resin 130 is lowered to immediately initiate the protecting step.

During the protecting step, the surface of the molten resin 130 is cooled to a degree without largely melting the urethane foam 131. After the surface of the molten resin 130 is sufficiently cooled, the protecting step is completed and the compression force is re-raised to initiate the dwelling step to cool and solidify the molten resin 130.

During the dwelling step, the resin 130 is cooled and solidified under a pressure sufficient to keep a predetermined shape of the molten resin 130. When the molten resin 130 is sufficiently cooled and solidified, the dwelling step is terminated and the molding product is ejected by opening the die 120. Incidentally, when the injection is completed, a plasticizing step for plasticizing the resin 130 for the next injection molding is initiated.

The compression forces during the packing step, the protecting step and the dwelling step are predetermined before conducting the injection compression molding. When respective set values of the compression force during the respective steps are represented as SP1 to SP3, the set values SP1 to SP3 can be defined as follows.

Specifically, the set value SP1 during the packing step is arranged as a pressure value large enough to spreading the molten resin 130, which is not more than 50 kg/cm$^2$ relative to a project area of the molding cavity.

The set value SP2 during the protecting step is arranged as a pressure value small enough not to crush or damage the urethane foam 131.

The set value SP3 during the dwelling step is arranged as a pressure value relatively large enough to press the molten resin 130 toward the molding surfaces 126 and 127 to keep a predetermined shape.

Incidentally, relative comparison of magnitude of respective set values SP1, SP2 and SP3 is represented as SP1>SP3>SP2.

According to the present embodiment, since the injection pressure increases during the filling step to immediately fill the molten resin 130 and large compression force is applied to the molten resin 130 during the packing step in the compression step to immediately flow the molten resin 130, a cycle time as a time required for molding one molding product can be shortened.

Since the pressure value during the packing step where the greatest compression force is applied in manufacturing the laminated molding is set not more than 50 kg/cm$^2$ as a pressure relative to project area of the molding cavity, the urethane foam does not break or get wrinkled even when the urethane foam is ether type or ester/ether type. Further, since the thickness of the urethane foam is not reduced, shock absorption of the urethane foam is not lowered and the urethane foam can be prevented from being hardened and deteriorating touch thereof.

Since the compression core 120C advanced during the compression step is retracted during the filling step for filling the molten resin 130 to secure a volume of space larger than the molding product inside the die 120, even when the molten resin 130 is filled inside the die 120 by increasing the injection pressure, the molten resin 130 does not crush the urethane foam 131, so that the damage of the urethane foam 131 during the filling step can be prevented in advance.

Further, since the urethane foam 131 is not crushed by compressing the molten resin 130 during the packing step where the molten resin 130 is flowable, great compression force is applied to the molten resin 130. And during the protecting step where the molten resin cannot flow, since the urethane foam 131 would be crushed if the molten resin 130 is compressed, the compression force applied to the molten resin 130 is reduced. Therefore, the urethane foam 131 is not crushed during the packing step and the protecting step, so that the damage of the urethane foam 131 can be prevented in advance.

Accordingly, the cycle time of the injection compression molding can be shortened without impairing the quality such as cushioning properties of the urethane foam 131.

At this time, since the attachment portion 124 for attaching the urethane foam 131 of the die 120 is arranged on the mutually opposing molding surfaces 126 and 127 of the stationary die 120A and the compression core 120C to directly apply the pressing force by the compression core 120C to the urethane foam 131, the force for pressing the urethane foam 131 can be minutely adjusted, so that the damage of the urethane foam 131 can be securely prevented by appropriately decreasing the pressing force toward the urethane foam 131 during the protecting step.

Further, since the molten resin 130 is cooled and solidified while re-raising the compression force during the dwelling step where the surface of the molten resin 130 is sufficiently cooled and the cushion properties of the urethane foam 131 is not impaired by the heat of the molten resin 130, the cooling time of the molten resin 130 can be further shortened without impairing cushion properties of the urethane foam 131, thus decreasing the cycle time in this point too.

Specific examples of the present embodiment will be described below.

EXAMPLE 1

In the above embodiment, a laminated molding product according to the present embodiment was manufactured by injection compression molding method under following specific condition.

The laminated molding product has an ether type urethane foam integrated to one side of a resin base, which is used as an airflow control valve of an air conditioner of an automobile.

(1) Foam Material
  Ether type urethane foam.
  1) Thickness: 6 mm, 2) Density: 20 kg/m$^3$, 3) Dimension: 100*200 mm (2) Resin
  Polypropylene including 30 wt % of mica [IDEMITSU PP J-950HP (trade name), MFR: 30]

(3) Die
  A die having a cavity formed of a stationary die, a movable die and a compression core for obtaining plate-shaped molding product having product dimension 100*200 mm and resin thickness: 3.0 mm, the die having a pin gate to a portion corresponding to a central portion of the product.

(4) Molding Process
  1) The urethane foam was set on the molding surface of the compression core and the die was closed. The compression core was retracted from the compression completion position for 20 mm.
  2) The molten resin was supplied into the cavity through the pin gate provided inside the stationary die. The temperature of the molten resin was 180° C., and injection time was 2.1 seconds. The temperature of the die was 30° C.
  3) Immediately after completion of resin supply, the compression core was advanced to compress the resin to render shape, thus integrally attaching the resin base and the urethane foam. The compression force was 6 ton, the pressure relative to project area of the molding cavity was 30 kg/cm$^2$.
  4) The molding product was cooled inside the die while applying a predetermined compression force. The cooling time was 40 seconds.
  5) After completion of cooling, the die was opened to eject the molding product.

(5) Result
  The thickness of the urethane foam of the laminated molding product was an average of 4.6 mm. Further, there were no break and wrinkle generated to the urethane foam, especially at a portion corresponding to neighborhood of the gate of the die and an airflow control valve having good cushion properties was obtained.

EXAMPLE 2

In the above embodiment, the laminated molding product of the present embodiment was manufactured by injection compression molding method according to following specific condition.

The laminated molding product has an ester/ether type urethane foam integrated to both sides of a resin base, which is used as an airflow control valve of an air conditioner of an automobile.

(1) Foam Material
  Ester/ether type urethane foam.
  1) Thickness: 6 mm, 2) Density: 25 kg/m$^3$, 3) Dimension: 100*200 mm 4) A resin circulation hole is formed to a position of one of the foams corresponding to the gate.

(2) Resin
  The same as in the Example 1.

(3) Die
  The same as in the Example 1.

(4) Molding Process
  1) The urethane foam was set on the respective molding surfaces of the stationary die and the compression core and the die was closed. The compression core was closer to a position with 10 mm of cavity clearance so that the foams were mutually compressed and retained there.
  2) The molten resin was supplied between the two urethane foams in the cavity through the pin gate provided inside the stationary die. The temperature of the molten resin was 180° C., and injection time was 2.1 seconds. The temperature of the die was 30° C.
  3) Immediately after initiating supply of the resin, the movable die was retracted to enlarge the volume of the cavity. The clearance between the molding surfaces of the compression core and the stationary die was 20 mm.
  4) Immediately after completion of resin supply, the die was closed to compress the resin to render shape, and the resin base and the both urethane foams were integrally attached. The compression force was 6 ton, which was 30 kg/cm$^2$ as a pressure relative to project area of the molding cavity.
  5) The molding product was cooled inside the die while applying a predetermined compression force. The cooling time was 40 seconds.
  6) After completion of cooling, the die was opened to eject the molding product.

(5) Result
  The thickness of the urethane foam of the laminated molding product was an average of 4.9 mm. Further, there were no break and wrinkle generated to the urethane foam, especially at a portion corresponding to neighborhood of the gate of the die and an airflow control valve having good cushion properties was obtained.

EXAMPLE 3

In the above embodiment, the laminated molding product of the present embodiment was manufactured by injection compression molding method according to following specific condition.

The laminated molding product has an ester/ether type urethane foam integrated to one side of a resin base, which is used as an airflow control valve of an air conditioner of an automobile.

(1) Foam Material

Ester/ether type urethane foam.

1) Thickness: 6 mm, 2) Density: 25 kg/m$^3$, 3) Dimension: 100*200 mm (2) Resin

The same as in the Example 1.

(3) Die

The same as in the Example 1.

(4) Molding Process

1) The urethane foam was set on the molding surface of the compression core and the die was closed. The compression core was retracted from a compression completion position for 20 mm 2) The molten resin was supplied into the cavity through the pin gate provided inside the stationary die. The temperature of the molten resin was 180° C., and injection time was 2.0 seconds. The temperature of the die was 30° C.

3) Immediately after completion of resin supply, the die was closed to compress the resin to render shape, and the urethane foam was integrally attached to the resin base. The compression force was 3 ton, which was 15 kg/cm$^2$ as a pressure relative to project area of the molding cavity.

4) The molding product was cooled inside the die while applying a predetermined compression force. The cooling time was 40 seconds.

5) After completion of cooling, the die was opened to eject the molding product.

(5) Result

The thickness of the urethane foam of the laminated molding product was an average of 5.3 mm. Further, there were no break and wrinkle generated to the urethane foam, especially at a portion corresponding to neighborhood of the gate of the die and an airflow control valve having good cushion properties was obtained.

EXAMPLE 4

The laminated molding product of the present embodiment was manufactured by injection compression molding method in the same manner as the Example 1 except that the compression force during cooling step was lowered to 1 ton (5 kg/cm$^2$) and retained for 3 seconds and, subsequently, the compression force was raised to 3 tons (15 kg/cm$^2$) and retained for 40 seconds.

The thickness of the urethane foam of the obtained laminated molding was an average of 5.0 mm. Further, there were no break and wrinkle generated to the urethane foam, especially at a portion corresponding to neighborhood of the gate of the die and an airflow control valve having good cushion properties was obtained.

EXAMPLE 5

The laminated molding product of the present embodiment was manufactured by injection compression molding process in an approximately the same manner as the above Example 2 except for a part of conditions.

(1) Foam Material

Changed to ether type urethane foam, and 2) the density was 20 kg/m$^3$. The other was the same as the Example 2.

(2) Resin

The same as in the Example 1.

(3) Die

The same as in the Example 1.

(4) Molding Process

1) The urethane foam was set on the respective molding surfaces of the stationary die and the compression core and the die was closed. The compression core was retracted and retained with 22 mm of cavity clearance.

2) The molten resin was supplied between two urethane foams in the cavity through the pin gate provided inside the stationary die. The temperature of the molten resin was 180° C., and injection time was 2.1 seconds. The temperature of the die was 30° C.

3) Immediately after completion of resin supply, the die was closed to compress the resin to render shape, and both of the urethane foams were integrally attached to the resin base. The compression force was 9 tons, which was 45 kg/cm$^2$ as a pressure relative to project area of the molding cavity.

4) The molding product was cooled inside the die while applying a predetermined compression force. The cooling time was 40 seconds.

6) After completion of cooling, the die was opened to eject the molding product.

(5) Result

The thickness of the urethane foam of the laminated molding product was an average of 4.4 mm. Further, there were no break and wrinkle generated to the urethane foam, especially at a portion corresponding to neighborhood of the gate of the die and an airflow control valve having good cushion properties was obtained.

EXAMPLE 6

In the first embodiment, the compression force during cooling step was changed to 1 ton (5 kg/cm$^2$) and the product was cooled for 50 seconds.

The thickness of the urethane foam of the obtained laminated molding product was an average of 5.0 mm. Further, there were no break and wrinkle generated to the urethane foam, especially at a portion corresponding to neighborhood of the gate of the die and an airflow control valve having good cushion properties was obtained.

Comparison 1

The laminated molding product of Example 1 was manufactured by conventional injection compression molding method.

(1) Foam Material

The same as in Example 1.

(2) Resin

The same as in Example 1.

(3) Die

The same as in Example 1. The compression core was fixed at an advanced position.

(4) Molding Process

1) The urethane foam was attached on a molding surface of the movable die and the die is completely closed.

2) The molten resin was supplied to the cavity through the pin gate provided inside the stationary die. The temperature of the molten resin was 180° C., and injection time was 3.6 seconds. Injection pressure was 200 kg/cm$^2$, and dwell pressure was 160 kg/cm$^2$. The temperature of the die was 30° C. Average pressure relative to project area of the molding cavity was 120 kg/cm$^2$.

3) The molding product was cooled inside the die. The cooling time was 40 seconds.

4) After completion of cooling, the die was opened to eject the molding product.

(5) Result

The thickness of the urethane foam of the laminated molding was an average of 3.0 mm, and the thickness was reduced to 2.3 mm around the gate of the die. Further, a break was generated at a portion of the urethane foam corresponding to the neighborhood of the gate of the die, thus unable to obtain good airflow control valve.

Comparison 2

The laminated molding product of the Example 3 was manufactured by a conventional injection molding method.
(1) Foam Material
    The same as in Example 2.
(2) Resin
    The same as in Example 1.
(3) Die
    The same as in Example 1.
(4) Molding Process
    The same as in Comparison 1. The compression core was fixed at an advanced position.
(5) Result
    The thickness of the urethane foam of the laminated molding was an average of 3.6 mm, and the thickness was reduced to 3.0 mm around the gate of the die. Though there was no break of urethane foam, crush at a portion corresponding to the gate of the die was imminently generated, thus unable to obtain good airflow control valve.

Comparison 3

The laminated molding product of the Example 3 was manufactured by a conventional injection molding method.
(1) Foam Material
    The same as in Example 3.
(2) Resin
    The same as in Example 3.
(3) Die
    The same as in Example 1. The compression core was fixed at an advanced position.
(4) Molding Process
    1) The urethane foam was attached on a molding surface of the movable die and the die is completely closed (clamped at a high pressure).
    2) The molten resin was supplied to the cavity through the pin gate provided inside the stationary die. The temperature of the molten resin was 180° C., and injection time was 4.8 seconds. Injection pressure was 50 kg/cm$^2$, and dwell pressure was 40 kg/cm$^2$. The temperature of the die was 30° C. Average pressure relative to project area of the molding cavity was 75 kg/cm$^2$.
    3) The molding product was cooled inside the die. The cooling time was 40 seconds.
    4) After completion of cooling, the die was opened to eject the molding product.
(5) Result
    The thickness of the urethane foam of the laminated molding was an average of 4.3 mm, and the thickness was imminently reduced to 3.6 mm around the gate of the die. Further, since the injection pressure was insufficient, sink was generated adjacent to an end of the product, so that good airflow control valve could not be obtained.

INDUSTRIAL AVAILABILITY

The present invention can be suitably used for manufacturing a laminated molding integrated with flexible surface member such as interior parts of an automobile like sun visor and headrest, and an airflow control valve of an air conditioner of an automobile.

What is claimed is:

1. A method for producing a laminated molding comprising a thermoplastic resin base and an ether type urethane foam provided on at least one side of the base, the ether type urethane foam mainly made of polyether polyol, wherein, when the urethane foam is set onto one of the molding surfaces of mutually opposing dies and a thermoplastic resin is supplied to the dies to integrally attach the thermoplastic resin base with the urethane foam simultaneously with injection compression molding or injection molding, a pressure loading applied to the resin is retained at not more than 50 kg/cm$^2$ of average pressure relative to a project area of a molding cavity, and wherein the resin is filled while keeping a cavity clearance between the mutually opposing dies not less than a thickness of the urethane foam and not more than a value adding 20 mm to the thickness.

2. The method for producing a laminated molding according to claim 1, further comprising the steps of:
    attaching the urethane foam onto only the one of the molding surfaces of the mutually opposing dies;
    while keeping the urethane foam attached to the molding surface, closing the die with a predetermined compression margin retained;
    filling the molten resin onto a side of the urethane foam in close contact with the molding surface;
    clamping the dies and applying a compression force to the molten resin in the dies to pack the molten resin throughout the entirety of the cavity; and
    after packing the molten resin, decreasing the compression force applied to the molten resin.

3. The method for producing a laminated molding according to claim 2, wherein the compression force, which is decreased after packing the molten resin in the entirety of the cavity, is re-raised before the molten resin solidifies.

4. A method for producing a laminated molding comprising a thermoplastic resin base and an ether type urethane foam provided on opposing sides of the base, the ether type urethane foam mainly made of polyether polyol, wherein, when the urethane foam is attached onto both inwardly facing molding surfaces of mutually opposing dies, and a thermoplastic resin is supplied to the dies to integrally attach the thermoplastic resin base with the urethane foam simultaneously with injection compression molding or injection molding, a pressure loading applied to the resin retains not more than 50 kg/cm$^2$ of average pressure relative to a project area of a molding cavity, and wherein the resin is filled while keeping a cavity clearance between the mutually opposing dies of not less than a sum of a thickness of the urethane foam on the facing molding surfaces of the mutually opposing dies and not more than value adding 20 mm to the sum of the thickness.

5. The method for producing a laminated molding according to claim 4, further comprising the steps of:
    attaching the urethane foam to both of the molding surfaces of the mutually opposing dies;
    making the dies attached with the urethane foam move closer so that the urethane foam provided on each of the molding surfaces touch with each other;
    while keeping the urethane foam touching each other, filling the molten resin between the urethane foam provided on each of the molding surfaces;
    after the molten resin is filled around a gate for introducing the molten resin into the dies, while continuing to fill the molten resin, opening the dies to secure a predetermined compression margin; and
    immediately before or after completion of filling the molten resin, clamping the dies and applying a compression force to the molten resin in the dies to pack the molten resin throughout the entirety of the cavity.

6. The method for producing a laminated molding according to claim 5, wherein the sum of the thickness of the urethane foam on the molding surfaces brought into contact with each other when the mutually opposing dies approach is set at not more than the sum of the thickness of the urethane foam on the molding surfaces, and, thereafter, the molten resin is filled between the urethane foam on the molding surfaces, and wherein, after the molten resin is filled at least around the gate for introducing the molten resin to the dies, while continuing to fill the molten resin, the dies open so that the cavity clearance is not less than the sum of the thickness of the urethane foam on the molding surfaces and not more than a value adding 20 mm to the sum.

7. The method for producing a laminated molding according to claim 5, wherein the compression force, which is decreased after packing the molten resin in the entirety of the cavity, is re-raised before the molten resin solidifies.

8. A method for producing a laminated molding utilizing a molding die including a stationary die and a movable die, the movable die including a compression core therein, the compression core having a retracted position and an extended position, comprising the steps of:

attaching a urethane foam onto a facing molding surface of the stationary die and at least onto an opposing facing molding surface of the movable die or the compression core thereof;

closing the molding die to forming a cavity therein;

maintaining the compression core at the retracted position to secure a compression margin;

injecting molten resin between the urethane foams until the molten resin fills a portion of the cavity adjacent a gate for introducing the resin;

subsequently, immediately before, or after completion of the resin injection, advancing the compression core to apply a compressive force having an average pressure relative to project area of the molding of not more than 50 kg/cm$^2$ to the molten resin to spread the resin throughout the entire cavity;

lowering the compression force applied to the molten resin to avoid damage to the urethane foam to enable cooling of a surface of the molten resin while preventing significant melting of the urethane foam;

after the surface of the molten resin is sufficiently cooled, utilizing the compression core to increase the compression force to enable the resin to have a predetermined shape; and after a predetermined time period when the resin is cooled enough to solidify and maintain the predetermined shape, removing the laminated molding from the molding die.

9. The method for producing a laminated molding according to claim 8, wherein the step of attaching a urethane foam onto the facing molding surface of the stationary die and at least the opposing facing molding surface of the movable die and/or the compression core comprises attaching an ether type urethane foam mainly made of polyether polyol.

10. The method for producing a laminated molding according to claim 8, wherein the step of attaching a urethane foam onto the facing molding surface of the stationary die and at least the opposing facing molding surface of the movable die and/or the compression core comprises attaching an ester/ether type urethane foam mainly made of polyester polyol and polyether polyol.

* * * * *